(12) United States Patent
Gordon et al.

(10) Patent No.: US 11,552,947 B2
(45) Date of Patent: Jan. 10, 2023

(54) HOME REALM DISCOVERY WITH FLAT-NAME USERNAMES

(71) Applicant: Microsoft Technology Licensing, LLC, Redmond, WA (US)

(72) Inventors: Ariel Gordon, Mercer Island, WA (US); Paul Garner, Seattle, WA (US); Rachel Anne Brown Teller, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 327 days.

(21) Appl. No.: 16/507,099

(22) Filed: Jul. 10, 2019

(65) Prior Publication Data
US 2021/0014224 A1    Jan. 14, 2021

(51) Int. Cl.
H04L 9/40       (2022.01)
H04L 12/28      (2006.01)

(52) U.S. Cl.
CPC ...... *H04L 63/0876* (2013.01); *H04L 12/2809* (2013.01); *H04L 63/0892* (2013.01)

(58) Field of Classification Search
CPC . H04L 63/0876; H04L 12/2809; H04L 63/10; H04L 63/102
See application file for complete search history.

(56) References Cited

U.S. PATENT DOCUMENTS

| 8,561,135 | B2* | 10/2013 | Upp | H04L 9/3263 |
| | | | | 455/410 |
| 9,398,526 | B2* | 7/2016 | Canpolat | H04W 48/18 |
| 2004/0088543 | A1 | 5/2004 | Garg et al. | |
| 2014/0026205 | A1* | 1/2014 | Guo | G06F 21/606 |
| | | | | 726/9 |
| 2014/0090037 | A1 | 3/2014 | Singh et al. | |
| 2014/0282821 | A1 | 9/2014 | Adler et al. | |
| 2018/0206117 | A1* | 7/2018 | Stahl | H04L 63/0823 |

OTHER PUBLICATIONS

"International Search Report and Written Opinion Issued in PCT Application No. PCT/US2020/034113", dated Jul. 9, 2020, 10 Pages.

* cited by examiner

*Primary Examiner* — Esther B. Henderson
(74) *Attorney, Agent, or Firm* — Fiala & Weaver P.L.L.C.

(57) ABSTRACT

Methods, systems, apparatuses, and computer program products are provided for automatically determining a home realm. An authentication request receiver interface may receive a request to access a resource and a device identifier from a client device. An authenticator may be enacted in response to receiving the request to access the resource that includes a home realm discoverer and an authentication user interface (UI) provider. The home realm discoverer may determine, based at least on the device identifier, the home realm from a plurality of realms. The authentication UI provider may provide, to the client device, an authentication UI via which a flat-name username can be submitted. Based at least on a flat-name user name and the determined home realm, access to the resource may be granted. In this manner, a user may input a flat-name username during sign-in, rather than inputting a realm or an entire e-mail address.

23 Claims, 6 Drawing Sheets

700

800

900

HOME REALM DISCOVERY WITH FLAT-NAME USERNAMES

BACKGROUND

When signing into an application to access a resource, users typically need to enter a set of credentials, such as a username and password, that will be authenticated by the application. In one conventional example, the application may interact with an identity system for managing such credentials and providing an interface through which credentials of a user may be validated. In many instances, a username may comprise a phone number or an email address because such username types are considered to be globally unique. In other examples, usernames may comprise flat-name usernames, such as a short sequence of characters and/or numbers (e.g., the first name of a user or an employee identification number for a given employee of an organization). Flat-name usernames provide convenience for users because flat-names are typically shorter than global usernames (e.g., email addresses), and therefore can be easier to remember and input while attempting to sign into an application. However, flat-name usernames are not designed to be globally unique, but rather are unique only in a particular realm, such as the application's namespace or within a particular organization.

While flat-name usernames allow different users in different organizations to share the same username (e.g., "alice"), such flat-name usernames may be problematic for certain multi-realm implementations where a single service provider may provide authentication services for a plurality of different organizations. For instance, in some multi-realm applications, users from multiple different organizations may access resources associated with their respective organizations by interacting with the same service provider. However, since flat-name usernames are only unique within each organization and not therefore not necessarily unique across different organizations, users of such multi-realm applications typically must enter a different or longer username (such as an entire email address) that is globally unique or visit a webpage tailored to a user's particular organization to enable the service provider to appropriately authenticate a user's credentials. Such techniques, however, require users to remember and input either a long login string or the address of the organization-specific website during a sign-in process, which can be cumbersome.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, apparatuses, and computer program products are provided for automatically determining a home realm. An authentication request receiver (e.g., of a server) may receive a request to access a resource from a client device. The authentication request receiver may also receive a device identifier from the client device, such as device registration identifier, a network address, or a web cookie. An authenticator may be enacted in response to receiving the request to access the resource that includes a home realm discoverer and an authentication user interface (UI) provider. The home realm discoverer may determine, based at least on the device identifier, the home realm from a plurality of realms. The authentication UI provider may provide, to the client device, an authentication UI via which a flat-name username can be submitted. Based at least on a flat-name username and the home realm determined by the home realm discoverer, access to the resource may be granted. In this manner, because the home realm may be automatically determined, a user need not manually input the realm (e.g., using an entire e-mail address) as part of a sign-in process, but may rather input a shorter flat-name username.

Further features and advantages of the invention, as well as the structure and operation of various embodiments, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

Figure 1:
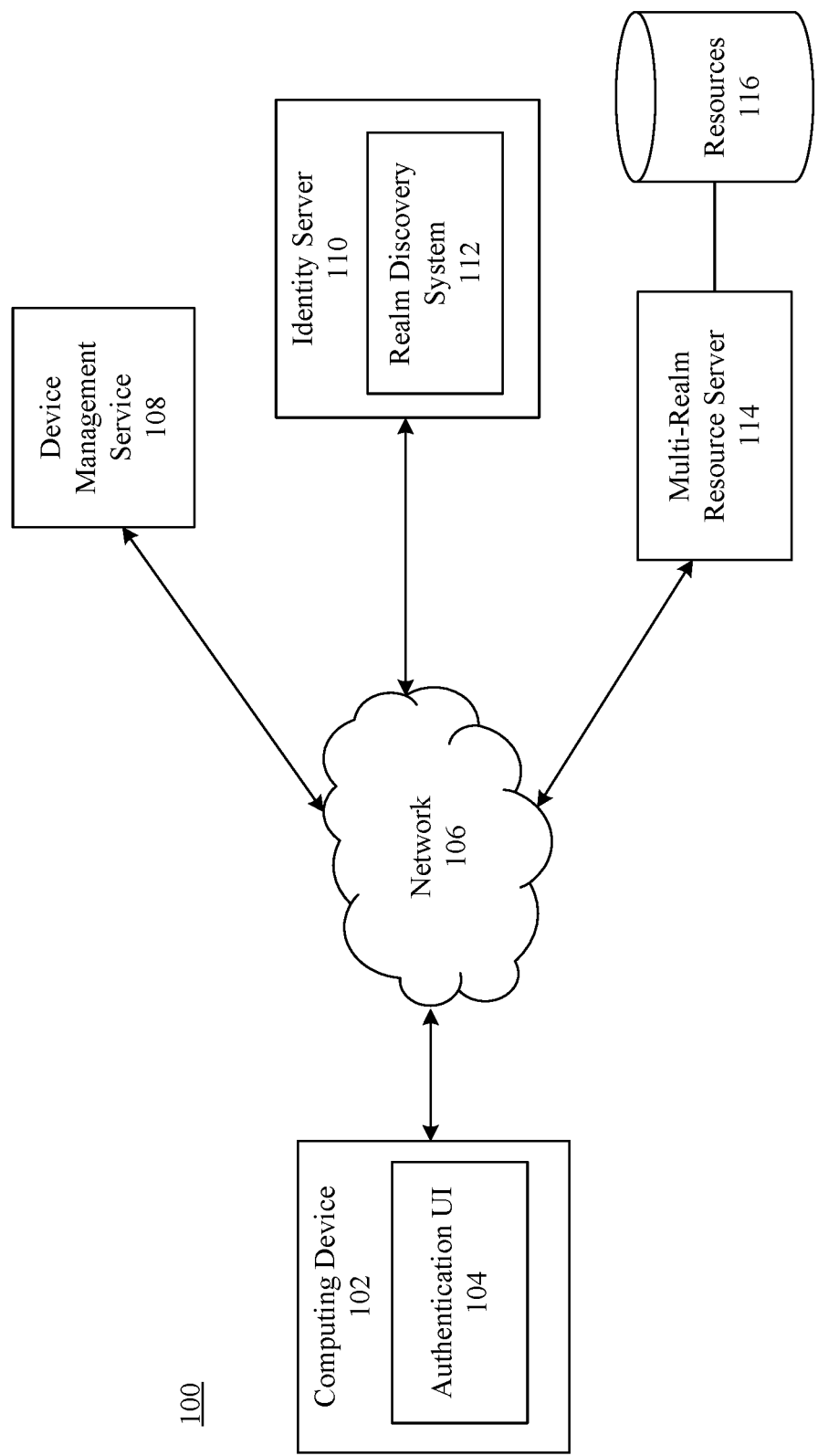
FIG. 1 shows a block diagram of a system for determining a home realm during a sign-in attempt, according to an example embodiment.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification and accompanying drawings disclose one or more embodiments that incorporate the features of the present invention. The scope of the present invention is not limited to the disclosed embodiments. The disclosed embodiments merely exemplify the present invention, and modified versions of the disclosed embodiments are also encompassed by the present invention. Embodiments of the present invention are defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an example embodiment, it is submitted that it is within the knowledge of one skilled in the art to effect such feature, structure, or characteristic in connection with other embodiments whether or not explicitly described.

In the discussion, unless otherwise stated, adjectives such as "substantially" and "about" modifying a condition or relationship characteristic of a feature or features of an example embodiment of the disclosure, are understood to mean that the condition or characteristic is defined to within tolerances that are acceptable for operation of the embodiment for an application for which it is intended.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Implementations

When signing into an application to access a resource, users typically need to enter a set of credentials, such as a username and password, that will be authenticated by the application. In one conventional example, the application may interact with an identity system for managing such credentials and providing an interface through which credentials of a user may be validated. In many instances, a username may comprise a phone number or an email address because such username types are considered to be globally unique. In other examples, usernames may comprise flat-name usernames, such as a short sequence of characters and/or numbers (e.g., the first name of a user or an employee identification number for a given employee of an organization). Flat-name usernames provide convenience for users because flat-names are typically shorter than global usernames (e.g., email addresses), and therefore can be easier to remember and input while attempting to sign into an application. However, flat-name usernames are not designed to be globally unique, but rather are unique only in a particular realm, such as the application's namespace or within a particular organization.

In an illustration, a user with a username of "alice" may be authorized to access a web application operated by a particular organization. The user may sign into the application using the username "alice" combined with an associated credential, such as a password. A different, unaffiliated organization may also operate the same (or different) web application and may authorize a user with a username of "alice" to access the web application of their organization. Typically, utilization of the same flat-name username ("alice") are not problematic so long as the web applications operate separately (e.g., running on different websites, hosted by different servers or entities) or are different applications. As a result, flat-name usernames may be utilized in such instances.

While flat-name usernames allow different users in different organizations to share the same username (e.g., "alice"), such flat-name usernames may be problematic for certain multi-realm implementations where a single service provider may provide authentication services for a plurality of different organizations. For instance, in some multi-realm applications that may be shared across different organizations, users from the various organizations may access resources associated with their respective organizations by signing into the same service provider to access the shared resources. However, since flat-name usernames are only unique within each organization and not therefore not necessarily unique across different organizations, utilization of flat-name usernames becomes difficult. A single shared sign-in page for various organizations may not be practical, since the service provider cannot identify which organization a user with the username "alice" belongs, and may need to query the user to select their respective organization. Such a technique not only requires an additional step that may be burdensome, but may also create potential privacy and/or security vulnerabilities.

In other techniques, different entry points may be provided to users of different organizations. For instance, with web applications, user of a given organization may be required to visit a website tailored specifically for that organization to access the web application, such as by visiting an address such as "https://organization.application.com," "https://application.com/organization," "https://application.com/organization," "https://application.organization.com," or the like, where the user may then enter a flat-name username. However, not only can it be difficult for users to remember the appropriate website address since many different permutations can exist, it is cumbersome for a user to type such a lengthy website address.

In another technique, users may visit a common website (or use a mobile application) that is shared across different organizations. However, in such a technique, users either need to enter the domain name of their organization (e.g., by signing in using a complete email address). For some organization users that do not have company email addresses, such users may nevertheless have to login using an email address format (e.g., user@organization.com), which may be unnatural to the user and error-prone. In other techniques, a user may be required to manually identify the name of the organization when sighing in, which can also be difficult where the user may not remember the precise company name or the subsidiary company to which the user belongs. As a result, even if a common website is employed, the cumbersome procedure to sign in to access a shared resource still remains, especially when using a mobile device where inputting user credentials is even more difficult.

Embodiments described herein address these and other issues by providing a system for discovering a home realm during a sign-in attempt that does not require users to enter a realm or organization name, or visit an organization-specific login page. In an example system, an authentication request receiver may receive a request to access a resource and a device identifier from a client device. A home realm discoverer may determine, based at least on the device identifier, the home realm from among a plurality of realms. An authentication UI provider may provide, to the client device, an authentication UI via which a flat-name username can be submitted. Based at least on a flat-name username submitted via the authentication UI and the home realm determined by the home realm discoverer, access to the resource may be granted. As a result, the user need not manually identify the organization during a sign-in process (e.g., by inputting a domain name, the company name, or visiting a company-specific login page), and may rather input a flat-name username to access a resource.

Granting access to a resource based on a flat-name username and an automatically determined home realm from among a plurality of realms has numerous advantages, including improving the graphical user interfaces employed during sign-in procedures. For example, since the realm may be automatically identified in the authentication UI (e.g., by automatically indicating an "@organization.com" format or using other techniques described herein), only a flat-name username may be required to be input as a login credential, thus simplifying and making the sign-in procedure quicker. Furthermore, since many users may access company resources using mobile devices with relatively small input interfaces, providing an interface through which the number of characters may be reduced further improves the usability and accessibility of such resources. In addition, while the sign-in procedure may be simplified in accordance with techniques described herein, other techniques for authenticating a user's credentials may still be employed, including but not limited to requiring a password, completing a multi-factor authentication procedure, or any other validation requirement in addition to a user's flat-name input, thereby maintaining the overall security of an organization resources.

Example embodiments are described as follows for systems and methods for enabling an identity system to discover a home realm during a sign-in attempt. For instance, FIG. 1 shows a block diagram of a system 100 for determining a home realm during a sign-in attempt, according to an example embodiment. As shown in FIG. 1, system 100 includes a computing device 102, a device management service 108, an identity server 110, a multi-realm resource server 114, which are communicatively coupled by a network 106, and resources 116 coupled to multi-realm resource server 114. System 100 may comprise any number of computing devices and/or servers, including those illustrated in FIG. 1 and optionally one or more further devices not expressly illustrated. As shown in FIG. 1, computing device 102 includes an authentication UI 104. As described in greater detail below, authentication UI 104 may provide a user interface (e.g., a graphical user interface) through which a user of computing device 102 may authenticate the user's identity in order to access resources 116. Identity server 110 determines a home realm during a user's attempted sign-in to access resources 116, and provide authentication UI 104 to computing device 102 corresponding to the determined home realm. Although FIG. 1 is described as comprising device management service 108 (described in greater detail below), such an implementation is not intended to be limiting. Other arrangements are also contemplated (e.g., without a device management service) that may enable realm discovery system 112 to determine a home realm during a sign-in attempt. System 100 is further described as follows.

Network 106 may include one or more of any of a local area network (LAN), a wide area network (WAN), a personal area network (PAN), a combination of communication networks, such as the Internet, and/or a virtual network. In example implementations, computing device 102, device management service 108, identity server 110, multi-realm resource server 114, and/or resources 116 may be communicatively coupled to each other via network 106. In an implementation, any one or more of computing device 102, device management service 108, identity server 110, multi-realm resource server 114, and/or resources 116 may communicate via one or more application programming interfaces (API), and/or according to other interfaces and/or techniques. Computing device 102, device management service 108, identity server 110, multi-realm resource server 114, and/or resources 116 may each include at least one network interface that enables communications with each other. Examples of such a network interface, wired or wireless, include an IEEE 802.11 wireless LAN (WLAN) wireless interface, a Worldwide Interoperability for Microwave Access (Wi-MAX) interface, an Ethernet interface, a Universal Serial Bus (USB) interface, a cellular network interface, a Bluetooth™ interface, a near field communication (NFC) interface, etc. Further examples of network interfaces are described elsewhere herein.

Computing device 102 includes any computing device of one or more users (e.g., individual users, family users, enterprise users, governmental users, etc.) that may comprise one or more applications, operating systems, virtual machines, storage devices, etc. that may be used to access resources 116 via network 106. In some examples, computing device 102 may access one or more server devices, such as device management service 108, identity server 110 and/or multi-realm resource server 114, to access resources 116, as described herein. Computing device 102 may include any number of computing devices, including tens, hundreds, thousands, millions, or even greater numbers of computing devices. Computing devices of computing device 102 may each be may be any type of stationary or mobile computing device, including a mobile computer or mobile computing device (e.g., a Microsoft® Surface® device, a personal digital assistant (PDA), a laptop computer, a notebook computer, a tablet computer such as an Apple iPad™, a netbook, etc.), a mobile phone, a wearable computing device, or other type of mobile device, or a stationary computing device such as a desktop computer or PC (personal computer), or a server. Computing device 102 is not limited to a physical machine, but may include other types of machines or nodes, such as a virtual machine. Computing device 102 may each interface with device management service 108, identity server 110, and/or multi-realm resource server 114 through APIs and/or by other mechanisms. Note that any number of program interfaces may be present.

Device management service 108 may comprise a service for managing devices coupled to network 106, including but not limited to a mobile device management (MDM) service. For instance, device management service 108 may comprise one or more software packages that may be installed and/or executed on computing device 102 to enable device management service 108 to remotely monitor, manage, and/or secure computing device 102. In examples, device management service 108 may implement one or more policies or rules on computing device 102 to restrict or impose certain functionalities of the computing device, including but not limited to restricting content (including applications) that may be downloaded, accessed, and/or executed, preventing or restricting the removal of data from the computing device, imposing mandatory security requirements (e.g., password or biometric security requirements), etc. In some other examples, device management service 108 may be configured to perform one or more other remote functions on computing device 102, such as remotely locking the computing device, factory resetting (e.g., wiping) the device, or carry out any other function that may be performed locally on computing device 102.

In implementations, device management service 108 may register each computing device 102 that is subject to device management. In some instances, device management service 108 may comprise certain sets of policies and/or rules for different organizations (e.g., clients, customers, employers, etc.), such that when a particular computing device is registered with device management service 108, the policies and/or rules associated with the organization to which the device is assigned may be implemented on the computing device. In some implementations, device management service 108 may assign an identifier, such as a tenant identifier, to each organization for which a plurality of computing devices may be managed. Examples of mobile device management services that may be used to implement techniques described herein include, but are not limited to, standalone MDM packages, such as VMware® AirWatch, Microsoft® Intune, and/or MDM services that may be implemented in conjunction with other software packages, such as Microsoft® Office365. These examples are not intended to be limiting, and it is contemplated that any other solution providing device management services may be used to implement features described herein.

Identity server 110 may comprise any computing device, server, and/or service for validating the identity of a user of computing device 102 to enable computing device 102 to access resources 116. Identity server 110 may be configured to validate a user's identity in one or more ways, including but not limited to validating user login credentials (e.g., a user name and/or password), a user alias, and/or an account number, validating a user based on biometric information (e.g., a fingerprint, retinal scan, etc.), confirmation of a code or message transmitted in an email or text message, or validating a user using any other information or credentials (or a combination thereof) to enable a user of the computing device to secure access to a resource.

In some instances, identity server 110 may be configured to validate the identities of users across a plurality of different organizations. For instance, identity server 110 may comprise one or more servers in a multi-domain network such that users across different organizations may validate their respective identities with the same identity server (or collection of servers) to access associated resources. In an example, identity server 110 may comprise a cloud-computing server or service configured to provide access to shared resources (e.g., storage resources, web applications, etc.) such that each user, once sign-in, may access the resources associated with the organization to which the user belongs.

Identity server 110 may operate in various ways to validate a user's identity in allowing access to a resource, including but not limited to issuing one or more authorization tokens to computing devices of network 106 requesting such tokens. An authorization token may include any object (e.g., a set of data) that enables a computing device, computing environment, and/or applications to access a resource (e.g., resources 116). For example, an authorization token may be a file or other object that includes one or more of an identifier for the token, an identifier for the associated logon session, an identifier for an application requesting access, a user identifier for the user of the application requesting access, and an indication of one or more privileges provided by the authorization token.

As will be described in greater detail below, realm discovery system 112 may enable a user of computing device 102 to perform a simplified or streamlined sign-in procedure by allowing the user to input a shortened user credential (e.g., a flat-name username). In implementations, realm discovery system 112 may be configured to automatically determine a home realm of a user of computing device 102 during a sign-in attempt, and provide authentication UI 104 to computing device 102 corresponding to the determined home realm. In this manner, the realm to which the user belongs need not be identified (by identifying an organization name, an email domain name, etc.) during sign-in, thereby reducing the user burden.

Multi-realm resource server 114 may comprise any one or more computing devices, servers, services, local processes, remote machines, web services, etc. for hosting, managing, and/or providing access to resources 116 by users of computing device 102. For instance, multi-realm resource server 114 may comprise a server coupled to an organization's network, a remotely located server, a cloud-based server (e.g., one or more servers in a distributed manner), or any other device or service that may host, manage, and/or provide access to resources 116 that may be shared across a plurality of different realms. Resources 116 may include any type of resource coupled to a network, including but not limited to computing or processing resources, software resources (e.g., software as a service (SaaS), platform as a service (PaaS), etc.), storage resources (e.g., physical storage devices, local storage devices, cloud-based storages, hard disk drives, solid state drives, random access memory (RAM) devices, etc.), databases, etc.

For instance, resources 116 may include storage devices for storing any data that is confidential, critical, private, secure, and/or not otherwise intended for public dissemination, such as company records, personal information, educational information, health information, professional information, organizational or company information, banking or other financial records, legal documents, biographic information such as birth certificates, driver's licenses, passports, etc. These examples are illustratively only, and resources 116 may include any other type of data (including both confidential and non-confidential information) that may be stored in any device whether locally and/or on a cloud-based storage. In some examples, resources 116 may be stored in a secure manner, such as via password protection, encryption (e.g., public and private key encryption, symmetric keys, etc.), or any other secure manner as appreciated by those skilled in the relevant arts.

It is noted and understood that implementations are not limited to the illustrative arrangement shown in FIG. 1. Rather, network 106 may comprise any number of computing devices and/or servers coupled in any manner. For instance, though computing device 102 is shown separate from device management service 108, identity server 110, multi-realm resource server 114, and resources 116, any one or more of such components (or subcomponents) may be co-located, located remote from each other, may be implemented on a single computing device, or may be implemented on or distributed across one or more additional computing devices not expressly illustrated in FIG. 1.

Figure 2:
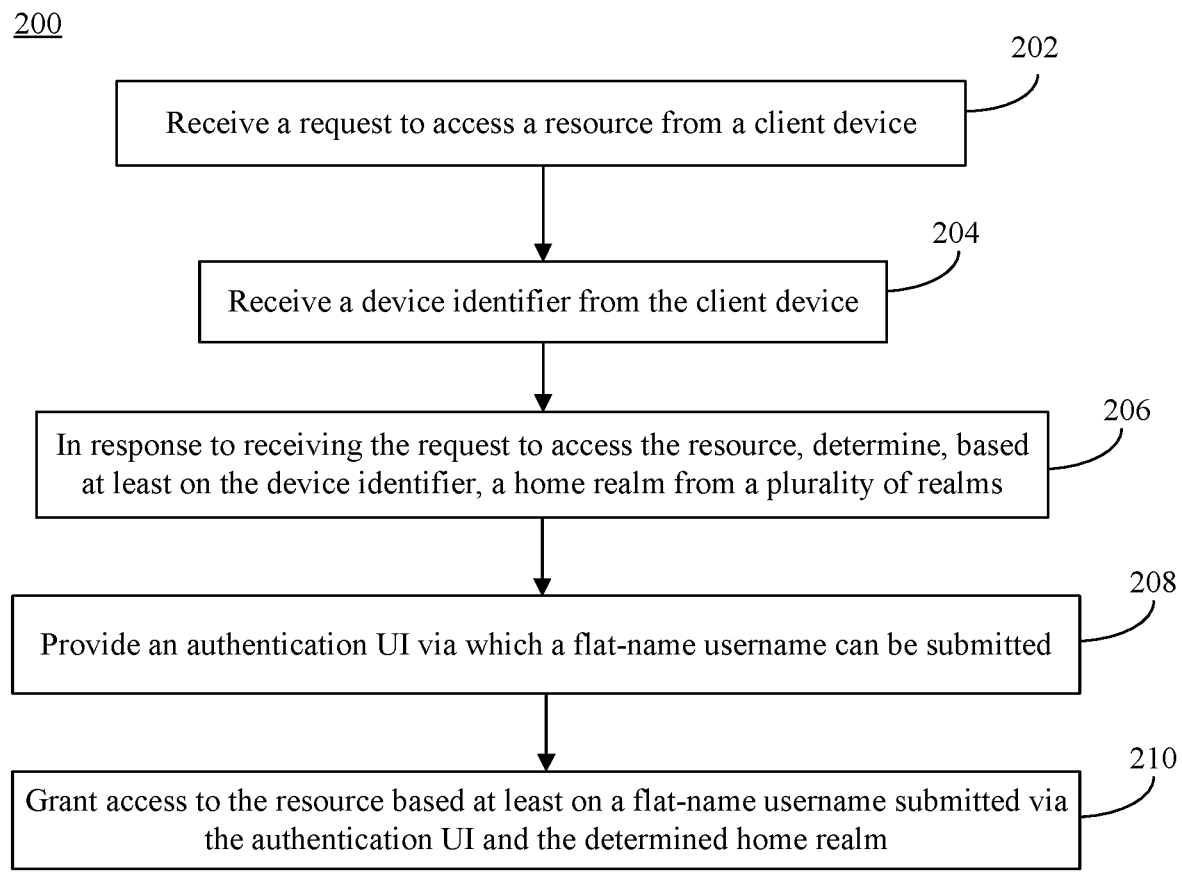
FIG. 2 shows a flowchart of a method for granting access to a resource based on a flat-name user name and a determined home realm, according to an example embodiment.

Realm discovery system 112 may operate in various ways to determine a home realm during a sign-in attempt. For instance, realm discovery system 112 may operate according to FIG. 2. FIG. 2 shows a flowchart 200 of a method for granting access to a resource based on a flat-name user name and a determined home realm, according to an example embodiment. For illustrative purposes, flowchart 200 and realm discovery system 112 are described as follows with respect to FIG. 3.

Figure 3:
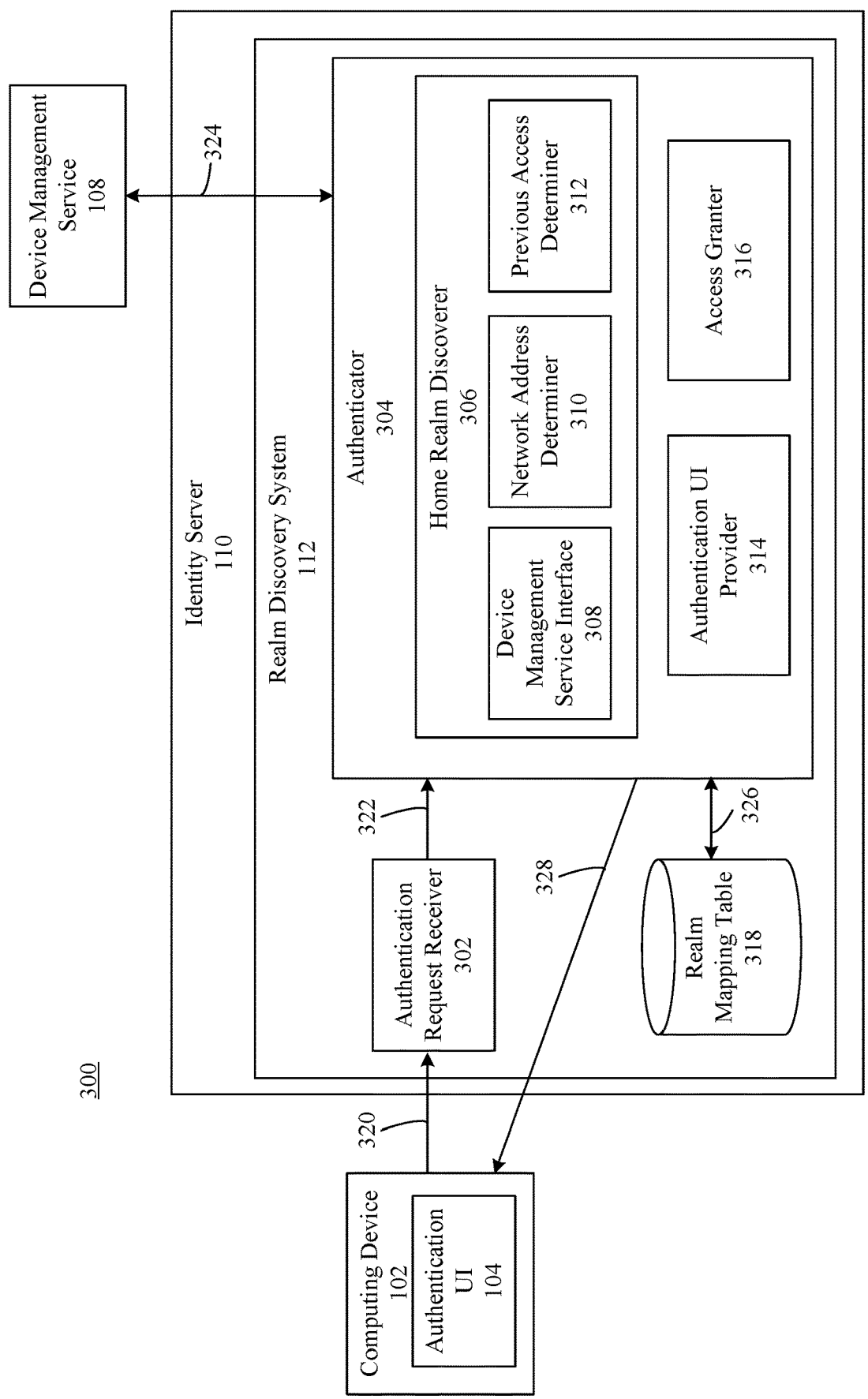
FIG. 3 shows a block diagram of a system for discovering a home realm during a sign-in attempt, according to an example embodiment.

FIG. 3 shows a block diagram of a system 300 for discovering a home realm during a sign-in attempt, according to an example embodiment. As shown in FIG. 3, system 300 includes an example implementation of computing device 102, device management service 108, and identity server 110. Computing device 102 includes authentication UI 104. Identity server 110 includes realm discovery system 112. As shown in FIG. 3, realm discovery system includes an authentication request receiver 302, an authenticator 304, and a realm mapping table 318. Authenticator 304 includes a home realm discoverer 306, an authentication UI provider 314, and an access granter 316. Home realm discoverer 306 may be configured to determine a home realm during a sign-in attempt and includes a device management service interface 308, a network address determiner 310, and a previous access determiner 312. Access granter 316 may be configured to grant computing device 102, upon a successful user authentication, access one or more shared resources of multi-realm resource server 114, described with reference to FIG. 1. Flowchart 200 and system 300 are described in further detail as follows.

Flowchart 200 of FIG. 2 begins with step 202. In step 202, a request to access a resource is received from a client device. For instance, with reference to FIG. 3, authentication request receiver 302 may be configured to receive 320 a request from computing device 102 to access a resource, such as one of resources 116. In some implementations, the request to access the resource may be comprise any act carried out to sign-in or validate a user's credentials. For instance, authentication request receiver 302 may receive a request upon a user attempting to access a certain website (e.g., a login page hosted by identity server 110 and/or multi-realm resource server 114), opening an application (e.g., a desktop or mobile application) in which user credentials may be submitted, etc.

As described above, identity server 110 may be configured to validate the credentials of users across a plurality of different organizations. Therefore, identity server 110 may provide a singular interface (e.g., a website, application, etc.) in some implementations that may be accessed by a user of computing device 102 in which users may input login credentials, such as a username and password, irrespective of the realm to which the user belongs. Accordingly, when access to resources hosted or managed by multi-realm resource server 114 is desired, a user of computing device 102 may initiate the sign-in process by interacting with identity server 110 in a domain-agnostic manner to access resources associated with the user (and/or the organization to which the user belongs). As an illustrative example, if a user of computing device 102 desires to access resources 116 associated with the user's organization, the user may transmit a request to authentication request receiver 302 to access such resources by visiting the same sign-in page (e.g., https://www.outlook.com). that may be utilized by users of other organizations.

In implementations, the requested resources may comprise resources (e.g., storage resources, web applications, etc.) hosted and/or managed by multi-realm resource server 114. As described earlier, multi-realm resource server 114 may comprise a server (e.g., a cloud-based server) that hosts and/or manages resources 116 for a plurality of different realms, such as different domains, organizations, tenants, clients, employers, etc. For example, multi-realm resource server 114 may comprise one or more software resources (e.g., SaaS, PaaS, etc.), storage resources, databases, etc. that may be shared, at least partially, across different subscribers. Accordingly, when access to resources 116 is desired by a particular subscriber from among a plurality of subscribers, identity server 110 may comprise an identity verification service such that upon a success credential validation, access to the resources associated with the particular subscriber may be granted. It is noted and understood that while identity server 110 and multi-realm resource server 114 are shown separately in FIG. 1, identity server 110 and multi-realm resource server 114 (and/or resources 116) may be implemented on a single server (or distributed across a collection of servers).

In step 204, a device identifier is received from the client device. For instance, upon an interaction with computing device 102 to initiate a sign-in attempt to access resources 116, authentication request receiver 302 may receive a device identifier from computing device 102. The device identifier may include any identifier associated with computing device, including a string or sequence of alphanumeric characters, a file, an object, or any other signal which may identify computing device 102. In some implementations, the device identifier may comprise an identifier that may be unique across one or more organizations that are subscribers of identity server 110. Examples of device identifiers that may be received by authentication request receiver 302 include, but are not limited to, hardware identifiers (e.g., Media Access Control (MAC) addresses, hardware serial numbers), software-based identifiers (e.g., application serial numbers, Internet Protocol (IP) addresses, cookies, certificates, etc.).

In implementations, the device identifier may be transmitted by computing device 102 to authentication request receiver 302 before, after, or concurrently with the request to access the resource described with reference to step 202. For instance, the device identifier may be provided in the same packet(s) or in a different packet than the access request. In some further implementations, the device identifier may be extracted from a packet header transmitted by computing device 102 (e.g., a header of a packet that includes the access request). Implementations are not limited to these examples, but may include any other manner and format of transmitting an identifier of computing device 102 to authentication request receiver 302 appreciated by those skilled in the relevant arts.

In step 206, in response to receiving the request to access the resource, a home realm from among a plurality of realms is determined based at least on the device identifier. For instance, with reference to FIG. 3, in response to receiving a request to access the resource, authenticator 304, which may include home realm discoverer 306, authentication UI provider 314, and access granter 316. In accordance with implementations, home realm discoverer 306 may be configured to determine a home realm associated with the sign-in attempt by a user of computing device 102 from among a plurality of realms. The home realm of associated with the sign-in attempt may comprise the realm to which the user attempting to sign-in belongs. For instance, the home realm may be a particular domain, organization, tenant, client, employer, etc. from among a plurality of realms that are subscribers of identity server 110 and/or multi-realm resource server 114. In other words, home realm discoverer 306 may be configured to automatically determine or infer, based at least on the received device identifier, which subscriber account a user of computing device 102 may be associated without the user expressly inputting or identifying a realm.

Home realm discoverer 306 may operate in various ways to determine a home realm from among a plurality of realms based at least on a device identifier received 322 from authentication request receiver 302. In one implementation, home realm discoverer 306 may determine a home realm by interacting with device management service 108 (e.g., an MDM) to determine which realm computing device 102 belongs. In another implementation, home realm discoverer 306 may determine the home realm by determining that network address of the computing device falls within a range of network addresses corresponding to the home realm. In another implementation, home realm discoverer 306 may determine the home realm by determining that another user of computing device 102 previously accessed resources associated with a particular realm. Each of these techniques will be described in greater detail below with reference to FIGS. 4-6.

It is noted and understood that these techniques are illustrative only, and implementations may discover a home realm based at least on a device identifier using other techniques. Furthermore, while a single technique may be implemented in some instances, other implementations may include utilizing a combination of techniques described herein (e.g., one or more of an interaction with a device management service, determining that a network address falls within a range of addresses, or determining that another user of the computing device previously accessed resources associated with a particular realm).

Additionally, in some implementations, home realm discoverer 306 may be configured to determine, based at least on the device identifier, a plurality of potential home realms. For instance, home realm discoverer 306 may determine two or more home realms from a plurality of realms managed by identity server 110, such as where a single computing device may be associated with several organizations (e.g., a computing device present in a store-within-a-store arrangement where an independent or semi-independent store operates within a larger retail location). For instance, such a computing device may be devices registered under a plurality of device management services, be coupled to a plurality of corporate networks, and/or may have been used to access resources of a plurality of different realms based on prior user sessions. In such an example, home realm discoverer 306 may determine, based on techniques described herein, each of the home realms to which computing device 102 may be associated.

In step 208, an authentication UI is provided in which a flat-name username can be submitted. For instance, with reference to FIG. 3, authentication UI provider 314 may be configured to provide authentication UI 104 to computing device 102 via which a flat-name username can be submitted. Thus, in examples, authentication UI 104 provided by authentication UI provider 314 may indicate, either expressly or implicitly, the home realm to which the user of computing device 102 likely belongs, such that the user need not input the realm during the sign-in process.

Authentication UI provider 314 may provide authentication UI 104 in various ways. In one implementation, authentication UI 104 may identify the realm by identifying a name of the subscriber, such as the name of the domain, organization, tenant, client, employer, etc. For instance, authentication UI 104 may provide a message or other indication that indicates that the sign-in page corresponds to a particular realm determined by home realm discoverer 306 (e.g., by indicating a message such as "Please sign-in to your Contoso account with your Contoso username" or the like). In another implementation, authentication UI 104 may include one or more pre-filled data fields that may identify the home realm determined by home realm discoverer 306. For instance, authentication UI provider 314 may provide authentication UI 104 that automatically prefills a portion of a login credential based on the home realm (e.g., by pre-filling the login filed with "@contoso.com," pre-filling an organization field with "Contoso," selecting "Contoso" from a drop-down menu). In some further implementations, the pre-filled data fields may be selectable via interaction with authentication UI 104 to enable a user to delete or change the realm (e.g., by clearing or writing over the pre-filled fields, selecting another realm from a drop-down menu, etc.).

In some other implementations, authentication UI provider 314 may provide authentication UI 104 that comprises a login interface that automatically redirects to a realm-specific login interface, such as by causing a web browser to be redirected to "mail.contoso.com" automatically upon a user visiting "www.outlook.com." A non-limiting example of authentication UI 104 is described in greater detail below with reference to FIG. 9. The implementations described herein are illustrative only, and may include other techniques for providing an interface to computing device 102 that includes, either expressly or implicitly, the home realm determined during a sign-in attempt.

In this manner, since authentication UI 104 may be provided to computing device 102 based on the home realm that is associated with computing device 102 (or likely be associated with the computing device) using one or more of the techniques described herein, the user need not separately input or submit the realm to which the user belongs, and rather may submit a flat-name username during a sign-in attempt via authentication UI 104. In other words, an employee of Contoso may be provided with authentication UI 104 that already identifies Contoso as the employee's home realm, enabling the employee to enter a flat-name username or user alias such as "alice" rather than an entire email address such as "alice@contoso.com."

While a flat-name username can comprise text-based characters (e.g., "alice") in some instances, flat-name usernames can include any other format, including alphanumeric usernames or numerical usernames that may comprise short strings that are not necessarily globally unique. For instance, a flat-name username can comprise an employee identification (ID) number or an account number with any appropriate length based on a given realm so long as the ID number is unique within the realm. For example, a flat-name username for an organization may comprise an employee ID that has a length of only a single digit, two digits, three digits, etc. based on the size of the organization. Even though flat-name usernames may not be globally unique (i.e., two different users across the various realms serviced by identity server 110 may have the same flat-name username), because authentication UI 104 may be provided in a manner that is based on an automatically determined home realm, users may nevertheless sign-in to resources 116 associated with their realm using only a flat-name username (and/or a password or the like) that has been designed to be unique within their realm. As a result, the employee may sign-in to access resources quicker and with reduced effort, thereby increasing the ease of access of resources 116.

It is noted and understood that authentication UI 104 and/or authenticator 304 may also provide additional techniques for validating a user's identity in conjunction with a flat-name submitted via authentication UI 104. For instance, authentication UI 104 may include one or more data fields or user interface elements for inputting a password, multi-factor authentication code, etc. to complete the sign-in process. In other examples, authenticator 304 may require identity verification using one or more biometric scanners (e.g., retinal scanners, fingerprint scanners, etc.), confirming a message or notification transmitted to another device (such as an authentication application executing on a mobile device), or any other enhanced identity verification techniques. Thus, while authentication UI 104 may provide an interface that enables a user to input only a flat-name username instead of expressly inputting an associated realm, other identity verification techniques may still be implemented prior to granting access to resources 116, thereby maintaining the security of such resources.

In step 210, access to the resource is granted based at least on a flat-name username submitted via the authentication UI and the determined home realm. For instance, with reference to FIG. 3, access granter 316 may be configured to grant access to resources 116 requested by a user of computing device 102 based at least on a flat-name username submitted via authentication UI 104 and the home realm determined by home realm discoverer 306. In examples, access granter 316 may be configured to validate a user's flat-name username (and/or any other credentials, such as a password, multi-factor authentication code, etc.) in various ways as will be appreciated to those skilled in the relevant arts, such as by looking up the identity information in a database corresponding to the determined home realm (e.g., a user or account database or the like) and making a comparison, providing the identity information to another server or service for validation, etc.

In some further implementations, such as where home realm discoverer 306 determines two or more home realms that may be associated with computing device 102, access granter 316 may be configured to grant access to the resource based on the flat-name username submitted via authentication UI 104 and a user selection of a particular one of the two or more determined home realms. For instance, as will be described in greater detail below with reference to FIG. 9, authentication UI 104 may present a list of potential home realms. During a sign-in attempt, a particular one of the plurality of home realms may be selectable during a sign-in attempt. In such an example, access granter 316 may be configured to validate the submitted user credentials (e.g., the flat-name user name and/or other validating information) based on the selected home realm.

Where validation is not successful (e.g., incorrect user credentials are received), access granter 316 may determine that access should not be permitted, and therefore deny access to the user of computing device 102. Where validation is successful, access granter 316 may grant access to the user of computing device 102 to access resources 116. Access granter 316 may grant access to computing device in various ways, including but not limited to providing an authorization token to computing device 102 that may be transmitted to multi-realm resource server 114 to complete the access request. An authorization token in accordance with implementations described herein may include a web token, an access token, a tokens generated in accordance with the Open Authorization (OAuth) standard, etc. Upon granting access by transmitting an authorization token, or in accordance with any other technique appreciated to those skilled in the relevant arts, computing device 102 may access resources 116 corresponding to the user's account (e.g., resources associated with the realm to which the user belongs, or a subset thereof).

Figure 4:
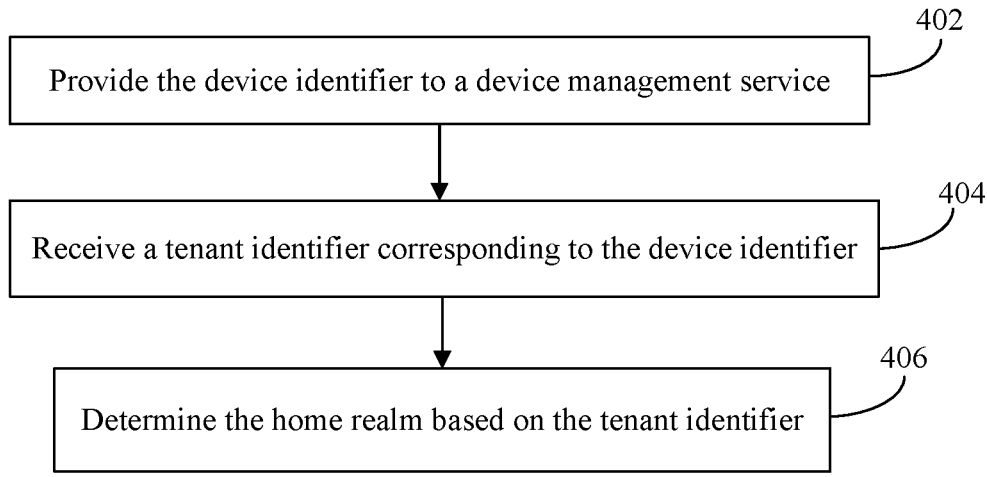
FIG. 4 shows a flowchart of a method for determining a home realm by providing the device identifier to a device management service, according to an example embodiment.

As described above, home realm discoverer 306 may operate in various ways to determine a home realm during a sign-in attempt. For example, FIG. 4 shows a flowchart of a method for determining a home realm by providing the device identifier to a device management service, according to an example embodiment. In an implementation, the method of flowchart 400 may be implemented by device management service 108 and/or device management service interface 308. FIG. 4 is described with continued reference to FIG. 3. Other structural and operational implementations will be apparent to persons skilled in the relevant art(s) based on the following discussion regarding flowchart 400 and system 300 of FIG. 3.

Flowchart 400 begins with step 402. In step 402, the device identifier is provided to a device management service. For instance, with reference to FIG. 3, device management service interface 308 may be configured to provide 324 the device identifier to device management service 108. As described above, device management service 108 may comprise a service that manages devices (e.g., security policies or the like) of a coupled to network 106, including but not limited to a mobile device management (MDM) service. In implementations, the device identifier may comprise a certificate or other file, object, or signal that indicates registration information of computing device 102 with device management service 108. In some examples, the device identifier comprising the device management registration information may be automatically transmitted by computing device 102 upon visiting a resource sign-in page or launching an application via which resources 116 may be accessed.

In step 404, a tenant identifier corresponding to the device identifier is received. For instance, with reference to FIG. 3, device management service interface 308 may receive 324, from device management service 108, a tenant identifier corresponding to the transmitted device identifier. For instance, the tenant identifier may identify a particular tenant from among a plurality of tenants registered with device management service 108 to which computing device 102 is associated.

In an illustrative example, computing device 102 may be registered as a Contoso device and managed by device management service 108 in accordance with policies and/or rules associated with Contoso's particular requirements. In such an example, computing device 102, upon initiating a sign-in attempt to access resources 116, may transmit a device identifier comprising a certificate to authentication request receiver 302. In response to receiving the certificate, device management service interface 308 may provide the certificate to device management service 108 to identify the tenant identifier (Contoso, in this example).

Device management service interface 308 and device management service 108 may interact in various ways, including but not limited to communicating via one more APIs, server-to-server (S2S) calls, or through any other suitable communication technique. Although examples are described herein using a device management service 108 that may be separate from identity server 110, implementations are not limited. For instance, instead of interacting with a separate device management service, device management service 108 may be implemented as part of identity server 110.

In other examples, realm mapping table 318, which may be stored locally and/or remotely, may comprise a mapping between device identifiers of registered computing devices (e.g., computing device 102) and their respective realms that may enable device management service interface 308 to readily identify a tenant identifier associated with a client identifier where a device management service may not be utilized. Accordingly, instead of utilizing a device management service to determine a tenant identifier, device management service interface 308 may interact 326 with realm mapping table 318 to determine whether a received client identifier has previously been mapped to a particular tenant.

In step 406, the home realm is determined based on the tenant identifier. For instance, with reference to FIG. 3, home realm discoverer 306 may determine the home realm associated with a sign-in attempt based on the tenant identifier received from device management service 108 or realm mapping table 318. In this manner, home realm discoverer 306 may automatically determine that a user is attempting to sign-in on a device known to belong to a particular realm (e.g. Contoso) based on a prior association of that device with a particular realm and/or management of the device by an MDM. As a result, if a user of computing device 102 attempts to access a generic login page (e.g., "www.outlook.com") that may be accessed by users of various different realms, home realm discoverer 306 may automatically determine the home realm of the computing device based on the prior association or registration, and provide authentication UI 104 enabling the user to login using a flat-name username.

Figure 5:
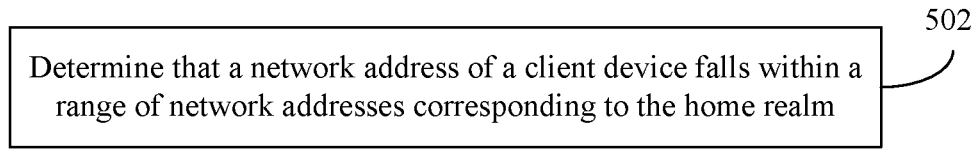
FIG. 5 shows a flowchart of a method for determining a home realm based on a network address of the client device, according to an example embodiment.

As described above, home realm discoverer 306 may operate in various other ways to determine a home realm during a sign-in attempt. In another implementation, home realm discoverer 306 may determine that a user is trying to sign-in to access resources 116 using a device (e.g. computing device 102) with certain network characteristics (e.g., coupled to a known network or within an IP address range) known to be associated with a particular realm. For example, FIG. 5 shows a flowchart of a method for determining a home realm based on a network address of the client device, according to an example embodiment. In an implementation, the method of flowchart 500 may be implemented by network address determiner 310. FIG. 5 is described with continued reference to FIG. 3. Other structural and operational implementations will be apparent to persons skilled in the relevant art(s) based on the following discussion regarding flowchart 500 and system 300 of FIG. 3.

Flowchart 500 begins with step 502. In step 502, it is determined that a network address of a client device falls within a range of network addresses corresponding to the home realm. For instance, with respect to FIG. 3, the device identifier received by authentication request receiver 302 may comprise a network address of computing device 102, such as a local or external IP address (e.g., as part of a packet header transmitted while initiating a sign-in attempt). Network address determiner 310 may compare the received network address against a repository of address ranges to determine the home realm of computing device 102. For example, if the network address of computing device 102 falls within a range of network addresses known to correspond to a particular realm among a plurality of realms, home realm discoverer 306 may automatically determine that computing device 102 is associated with such a realm and cause authentication UI provider 314 to provide authentication UI 104 to computing device 102 based on the determined home realm.

In an illustration, computing device 102 may be located in a shared workspace, such as a breakroom, of an organization and coupled to the organization's corporate network. When a user initiates a sign-in attempt on computing device 102 to access resources 116 associated with the organization by visiting a generic login page (e.g., www.office.com), network address determiner 310 of identity server 110 may determine that the received IP address of computing device 102 is in range of addresses known to belong to a particular realm among a plurality of realms, and enable home realm discoverer 306 to automatically infer that a user of computing device 102 belongs to the determined home realm.

It is noted, however, that network address determiner 310 is not limited to determining whether a computing device belongs to a home realm based on an address falling within a range, but may also operate in other ways. In some other implementations, realm mapping table 318 may comprise a mapping of known networks or network addresses (e.g., individual IP addresses, rather than ranges of IP addresses) and associated realms such that home realm discoverer 306 may determine a home realm of a computing device by comparing the received network address with a corresponding address in realm mapping table 318. In yet other implementations, network address determiner 310 may determine a home realm using any other network characteristics that may be provided by computing device 102 during a sign-in attempt, such as a network name, a Service Set Identifier (SSID) of a wireless network, a network or geographic location (based on network parameters or any other data, such as Global Position Sensor (GPS) data), or any other parameters.

Figure 6:
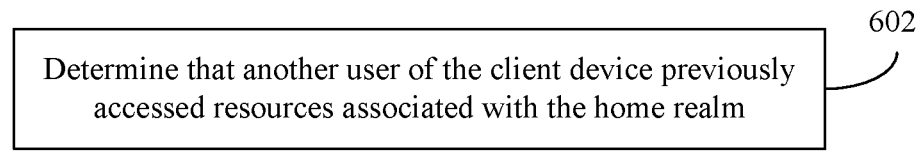
FIG. 6 shows a flowchart of a method for determining a home realm based on a prior access of resources associated with the home realm, according to an example embodiment.

As described above, home realm discoverer 306 may also determine a home realm based on a previous access of resources 116. For example, FIG. 6 shows a flowchart of a method for determining a home realm based on a network address of the client device, according to an example embodiment. In an implementation, the method of flowchart 600 may be implemented by previous access determiner 312. FIG. 6 is described with continued reference to FIG. 3. Other structural and operational implementations will be apparent to persons skilled in the relevant art(s) based on the following discussion regarding flowchart 600 and system 300 of FIG. 3.

Flowchart 600 begins with step 602. In step 602, it is determined that another user of a client device previously accessed resources associated with the home realm. For instance, with reference to FIG. 3, the device identifier received by authentication request receiver 302 may comprise a cookie or other object or file stored on computing device 102 in connection with a previous access of resources 116 associated with a particular realm. Upon a different user (or the same user) of the same computing device attempting to sign-in to access resources, computing device 102 may provide the previously stored cookie. Previous access determiner 312 may determine, based on the received cookie, that the same computing device previously accessed resources 116 of a particular realm, enabling home realm discoverer 306 to infer that the current sign-in attempt is to access resources of the same realm.

In an illustrative example, computing device 102 may be located in a shared workspace, such as a breakroom, of an organization named Contoso. A first user (e.g., "bob") may interact with computing device 102 to sign-in to identity server 110 to access resources 116. In some instances, such as where the computing device may not be registered with a device management service or not coupled to a known corporate network, the first user may need to identify the appropriate realm during the sign-in attempt, such as by input a full-length username (e.g., "bob@contoso.com") or otherwise identify Contoso during sign-in using a generic login page. Upon validating the first user's credentials, previous access determiner 312 may be configured to transmit a cookie (or other information, object, file, signal, etc.) for storage on computing device 102 that indicates that computing device 102 previously accessed resources associated Contoso's resources. In the event that the first user logs out and another user (e.g., "alice") initiates a sign-in attempt using the same computing device, such as by visiting the same generic login page. Since computing device 102 may transmit the previously stored cookie to identity server 110 in connection with visiting the generic login page, previous access determiner 312 may determine that a previous user session existed on the same computing device to access resources 116 associated with a particular realm. As a result, home realm discoverer 306 may automatically infer that the second user (and subsequent users thereafter) may attempt to access resources associated with the same realm of the previous user session, and provide authentication UI 104 to computing device 102 accordingly. In this manner, upon visiting the generic login page, the second (and subsequent users) need not manually identify the realm during sign-in, and instead may input only a flat-name username as a login credential.

Figure 7:
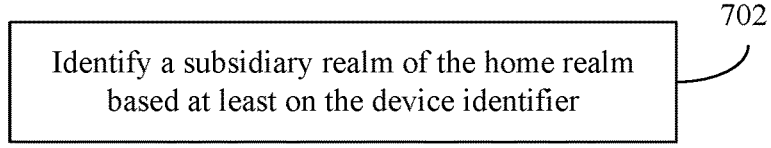
FIG. 7 shows a flowchart of a method for identifying a subsidiary realm of the home realm, according to an example embodiment.

In some implementations, home realm discoverer 306 may be configured to determine a subsidiary realm. For example, FIG. 7 shows a flowchart of a method for identifying a subsidiary realm of the home realm, according to an example embodiment. In an implementation, the method of flowchart 700 may be implemented by home realm discoverer 306. FIG. 7 is described with continued reference to FIG. 3. Other structural and operational implementations will be apparent to persons skilled in the relevant art(s) based on the following discussion regarding flowchart 700 and system 300 of FIG. 3.

Flowchart 700 begins with step 702. In step 702, a subsidiary realm of a home realm is identified based at least on the device identifier. For instance, with reference to FIG. 3, home realm discoverer 306 may be configured to identify a subsidiary realm of the home realm determined by home realm discoverer 306 based at least on the device identifier. In examples, a subsidiary realm may comprise a smaller realm within a larger home realms, such as a particular geographic region, store location, branch, etc. of a larger organization. In one illustration, for instance, a home organization may comprise a worldwide realm associated with a particular organization (e.g., "Contoso Ltd."), while a subsidiary realm may comprise one or more subsidiary realms within Contoso Ltd., such as Contoso North America, Contoso Northwest, Contoso Seattle, etc.

Using any one or more of the techniques described herein, home realm discoverer 306 may automatically determine, in addition to a home realm (Contoso), a subsidiary realm of the home realm based at least on a device identifier. For instance, device management service interface 308 may determine, based on an interaction with device management service 108, that a device identifier (e.g., a management certificate) indicates that the device was configured for a particular region and/or store of a larger organization. In other implementations, network address determiner 310 may determine, using similar techniques described herein, that a network address of a computing device 102 falls within a range of addresses known to belong to a particular subsidiary realm of a larger home realm. In yet other implementations, previously access determiner 312 may be configured to provide a cookie to computing device 102 that indicates a subsidiary realm of a prior user session, such that home realm discoverer 306 may automatically identify the subsidiary realm for subsequent user sign-in attempts.

As a result, flat-name usernames may need to be unique only in a given subsidiary realm, rather than being unique across a larger home realm. In other words, a large multi-national organization comprising different subsidiary realms may utilize flat-name usernames comprising shorter employee ID numbers (e.g., 4-digit employee ID numbers that need to be unique only within their subsidiary realm), rather than longer ID numbers (e.g., 8-digit employee ID numbers that may need to be unique across the entire multi-national organization). Thus, even if the same employee ID number were assigned to employees in different subsidiary realms of the home realm, problematic conflicts may not occur since such employees may sign-in to access resources with the authentication UI that corresponds to their respective subsidiary realm. In this manner, since flat-name usernames may be reused in some organizations, flat-name usernames for such organizations may be designed to be shorter in length, thus further streamlining the sign-in process and improving the ease of access of resources 116.

Figure 8:
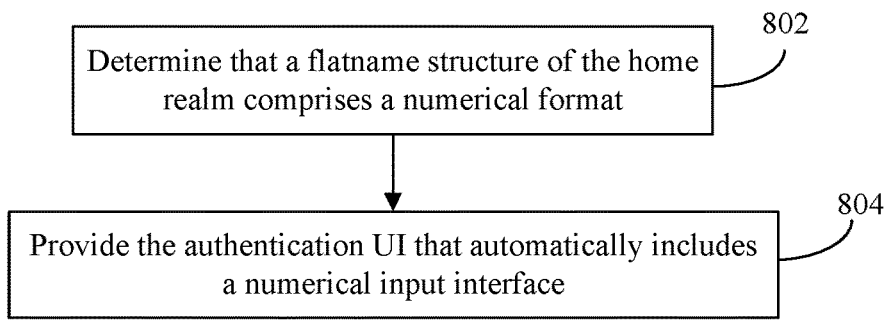
FIG. 8 shows a flowchart of a method for providing an authentication UI that includes a numerical input interface, according to an example embodiment.

In some implementations, authentication UI provider 314 may be configured to provide authentication UI 104 based on a flat-name username format of a determined home realm. For example, FIG. 8 shows a flowchart of a method for providing an authentication UI that includes a numerical input interface, according to an example embodiment. In an implementation, the method of flowchart 800 may be implemented by authentication UI provider 314 and/or authentication UI 104. FIG. 8 is described with continued reference to FIG. 3. Other structural and operational implementations will be apparent to persons skilled in the relevant art(s) based on the following discussion regarding flowchart 800 and system 300 of FIG. 3.

Flowchart 800 begins with step 802. In step 802, a flat-name username structure of the home realm is determined to comprise a numerical format. For instance, authentication UI provider 314 may be configured to determine that a flat-name username structure for the home realm determined by home realm discoverer 306 comprises a certain format, such as a numerical character format (e.g., a numerical employee ID). Authentication UI provider 314 may determine such a structure in various ways, including but not limited to predetermined knowledge (e.g., stored in realm mapping table 318 or in another repository) indicating the flat-name username formats for each of the realms and subsidiary realms managed by identity server 110, based on previous user session information, or in accordance with any other suitable technique appreciated by those skilled in the relevant arts.

In step 804, an authentication UI is provided that automatically includes a numerical input interface. For instance, with reference to FIG. 3, authentication UI provider 314 may provide authentication UI 104 that automatically includes a numerical input interface. The numerical input interface may comprise, for example, a pop-up interface (e.g., a touch-screen interface or the like) that may automatically appear in the UI of computing device 102 in a manner that enables a user to input numerical digits in an easier fashion. In one example, the numerical input interface may comprise an input interface that comprises only numerical digits to minimize the likelihood of an invalid character (e.g., a text-based character) being submitted as part of a flat-name username. In other examples, the numerical input interface may comprise an interface with larger numerical digits than a default layout. However, these examples are not limiting, and it is understood that any other manner of providing a user interface based on a flat-name structure of a determined home realm that improves the ease of access is contemplated herein.

As described above, authentication UI 104 may enable a user of computing device 102 to enter a flat-name username during a sign-in attempt. FIG. 9 depicts an illustrative authentication UI 900 in which features of example embodiments described herein may be implemented. As shown in FIG. 9, authentication UI 104 includes a plurality of user interface elements associated with a sign-in attempt to access resources, including a flat-name username element 902, a home realm element 904, and an input interface 906. In examples, authentication UI 104 may comprise an illustrative UI that may be presented upon a user visiting a generic login page to access resources managed by a multi-realm resource server, as described herein.

Figure 9:
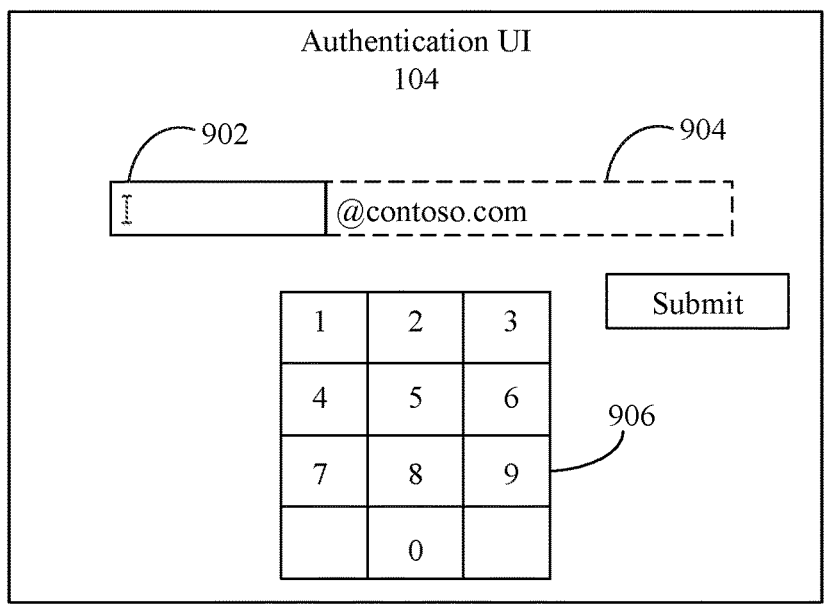
FIG. 9 shows an illustrative authentication UI in which features of example embodiments described herein may be implemented.

As shown in FIG. 9, flat-name username element 902 may comprise a field in which a user may input a flat-name username to access resources. The flat-name username may include a short alias, such as a short string of characters (e.g. "alice") and/or numbers that is unique within a given realm or subsidiary realm, but need not be unique across all realms. Home realm element 904 may comprise a pre-populated field in accordance with techniques described herein that may identify a portion of a username containing a domain name (e.g., "@contuso.com") as shown in FIG. 9, or identity an organization name corresponding to the realm. In some implementations, home realm element 904 may modified through a user interaction, such as where a user desires to login under a realm different than the automatically determined home realm. While flat-name username element 902 and home realm element 904 are illustrated as being separate user interface elements, such illustration is not intended to be limiting in nature. Flat-name username element and home realm element 904 may be part of a common or singular data entry field (e.g., text box in which a username may be provided) in which a portion of the field comprises pre-populated information to identify the realm.

In another implementations, such as where home realm discoverer 306 determines two or more home realms may be associated with computing device 102 from among a plurality of realms, home realm element 904 may comprise a listing of the two or more determined realms and/or organizations names, such as in a drop or pull-down menu, via selectable radio buttons or icons, or other user interface element that enables a particular realm from among a plurality of realms to be selected as the home realm. In such an example, authentication UI 104 may be configured to select a particular realm or organization name from among the plurality of determined realms or organizations in response to a user selection of the particular realm or organization name, such that the user need not manually type the realm identifying information during a sign-in attempt.

In yet another implementation, home realm element 904 may comprise an element that identifies the realm or organization name determined by home realm discoverer 306 in fixed manner (e.g., not able to be overwritten), while providing a second home realm element (not shown) that may be selected to enable users to enter a complete email address, or a different realm or organization that may be used during sign-in. For instance, if an outside visitor of a company interacts with authentication UI 104 of a shared breakroom computer to access resources associated with the visitor's employer (which may be different than the company to which computing device 102 is registered), one or more of the user elements described herein may be selectable, modified, and/or overwritten to enable the visitor to select or input a different realm or organization, enabling the visitor to complete the sign-in process.

In some other implementations, authentication UI 104 may comprise a redirected webpage that corresponds to the home realm determined by home realm discoverer 306. For instance, if a user of computing device 102 attempts to visit a generic webpage to access resources 116, authentication UI provider 314 may provide authentication UI 104 that redirects a browser to a login interface associated with the determined home realm instead of pre-filling one or more data entry fields as described.

In some other implementations, authentication UI 104 may comprise input interface 906, which may include a numerical input interface. For instance, as described with reference to FIG. 8, authentication UI provider 314 may determine a particular flat-name username structure for the home realm determined by home realm discoverer 306, and provide input interface 906 corresponding the flat-name username structure. While a numerical input interface is depicted in FIG. 9, any other input interface may be presented in addition to, or as an alternative to, a numerical input interface, including a text-based input interface (e.g., a QWERTY keyboard), an input interface that may comprise one or more special characters, or any combination thereof. Furthermore, input interface 906 need not be provided by authentication UI provider 312 as a user interface element of authentication UI 104, but rather may be provided as another signal (e.g., metadata) to flat-name username element 902, such that when authentication UI 104 is presented on computing device 102, an input interface natively installed on computing device 102 may be configured to pop-up automatically or in response to a user selecting flat-name username element 902 based on the flat-name username structure of the home realm. In other words, if authentication UI provider 314 determines that the flat-name structure for a particular home realm comprises only numerical digits, authentication UI 104 may be provided such that a natively installed input interface (e.g., a keyboard application on a mobile device) is configured to automatically present a numerical layout instead of a text-based layout (or other default layout that may be presented).

These illustrations are only intended to depict various example embodiments in which flat-name username element 902 and home realm element 904 may be implemented. It is understood that any other structure or format of authentication UI 104 may be provided for presentation on computing device 102 that enables a user to input a login credential using only a flat-name username. Furthermore, as described, any suitable UI element (or combination of UI elements) may be employed to enable users of computing device 102 to login to a different realm by identifying or selecting a different realm name, organization name, inputting an email address that may include a domain name, or by inputting any other username or credential that may validated by identity server 110.

In some implementations, authentication UI 104 need not comprise information that identifies the home realm to a user of computing device 104. For instance, an authentication UI may be provided that enables a user to input only a flat-name username (without expressly identifying the home realm either by inputting the realm or identifying an organization name) during a sign-in attempt, and access granter 316 may use the inputted flat-name username in conjunction with the home realm determined by home realm discoverer 306 to validate the user's credentials. In such examples, home realm discoverer 306 may be configured to determine the home realm automatically upon a user of computing device initiating a sign-in process (e.g., by visiting a login page or launching an application), and/or may determine the home realm after a user submits one or more login credentials, such as a flat-name username, using one or more of the techniques described herein. Accordingly, while example embodiments have been described in which authentication UI 104 may be presented on computing device 102 in a manner that is specific to the determined home realm, other techniques that do not require realm-specific interfaces to be presented are also contemplated and within the scope.

Although some implementation have been described herein as enabling a user to submit a flat-name username via authentication UI 104, techniques described above may also be implemented in some instances where a user may sign-in to a service using a globally unique identifier (e.g., an email address, a phone number, or other alphanumeric string that is globally unique across all realms). For example, a particular individual may be employed by or otherwise associated with a plurality of different organizations. In some instances, the individual may have a single global login credential (e.g., a personal phone number in connection with a password, a one-time code received in a text message, etc.) that may be used to access resources associated with both organizations. While an interface may be presented in which the individual may select or input the appropriate realm prior to, during, or after submission of the individual's login credentials, such an interface may impose an additional step on the individual to confirm which organization's resources the individual desires to access.

Instead, by implementing techniques described herein, home realm discoverer 306 may automatically infer, based on any one or more of the home realm discovery techniques described herein (including but not limited to techniques described with reference to FIGS. 4, 5, and 6), that the individual has signed-in, or attempting to sign-in, using a device associated with a particular realm. For example, home realm discoverer 306 may determine that the individual is signing in on a device that is registered to a particular organization, connected to a particular organization's corporate network, or was previously used to access resources of a particular organization in a prior user session. Thus, even though the individual is signing into identity server using a global identifier (e.g., a phone number), home realm discoverer 306 may automatically infer that the individual is attempting to access resources for a particular organization, thereby reducing the burden on the individual and streamlining the sign-in process.

III. Example Mobile and Stationary Device Embodiments

Computing device 102, authentication UI 104, device management service 108, identity server 110, realm discovery system 112, multi-realm resource server 114, resources 116, authentication request receiver 302, authenticator 304, home realm discoverer 306, device management service interface 308, network address determiner 310, previous access determiner 312, authentication UI provider 314, access granter 316, realm mapping table 318, flowchart 200, flowchart 400, flowchart 500, flowchart 600, flowchart 700, and/or flowchart 800 may be implemented in hardware, or hardware combined with software and/or firmware, such as being implemented as computer program code/instructions stored in a physical/hardware-based computer readable storage medium and configured to be executed in one or more processors, or being implemented as hardware logic/electrical circuitry (e.g., electrical circuits comprised of transistors, logic gates, operational amplifiers, one or more application specific integrated circuits (ASICs), one or more field programmable gate arrays (FPGAs)). For example, one or more of computing device 102, authentication UI 104, device management service 108, identity server 110, realm discovery system 112, multi-realm resource server 114, resources 116, authentication request receiver 302, authenticator 304, home realm discoverer 306, device management service interface 308, network address determiner 310, previous access determiner 312, authentication UI provider 314, access granter 316, realm mapping table 318, flowchart 200, flowchart 400, flowchart 500, flowchart 600, flowchart 700, and/or flowchart 800 may be implemented separately or together in a SoC. The SoC may include an integrated circuit chip that includes one or more of a processor (e.g., a central processing unit (CPU), microcontroller, microprocessor, digital signal processor (DSP), etc.), memory, one or more communication interfaces, and/or further circuits, and may optionally execute received program code and/or include embedded firmware to perform functions.

Figure 10:
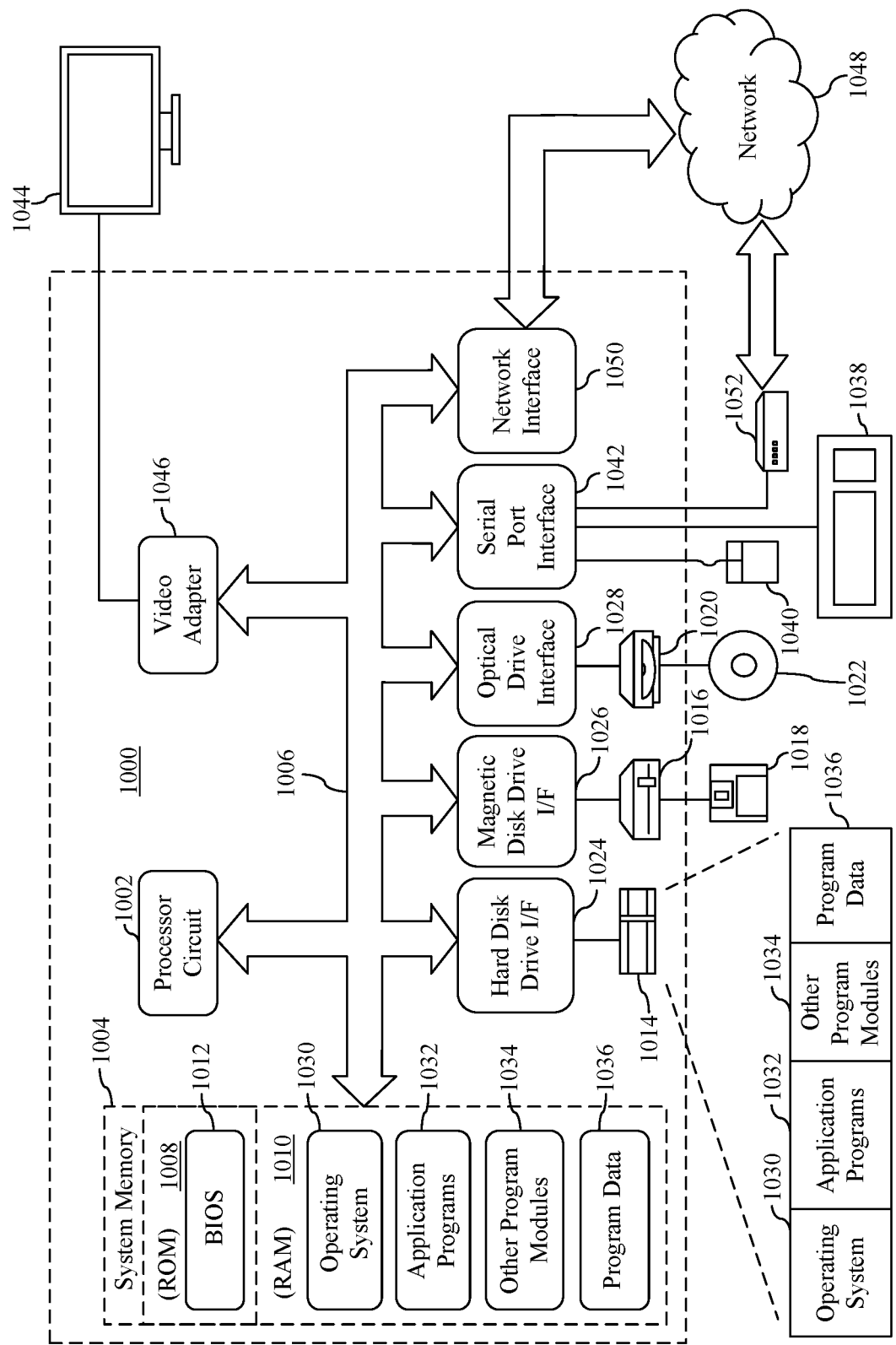
FIG. 10 shows a block diagram of an example computing device that may be used to implement example embodiments.

FIG. 10 depicts an exemplary implementation of a computing device 1000 in which example embodiments may be implemented. For example, any of computing device 102, authentication UI 104, device management service 108, identity server 110, realm discovery system 112, multi-realm resource server 114, resources 116, authentication request receiver 302, authenticator 304, home realm discoverer 306, device management service interface 308, network address determiner 310, previous access determiner 312, authentication UI provider 314, access granter 316, and/or realm mapping table 318 may be implemented in one or more computing devices similar to computing device 1000 in stationary or mobile computer embodiments, including one or more features of computing device 1000 and/or alternative features. The description of computing device 1000 provided herein is provided for purposes of illustration, and is not intended to be limiting. Example embodiments may be implemented in further types of computer systems, as would be known to persons skilled in the relevant art(s).

As shown in FIG. 10, computing device 1000 includes one or more processors, referred to as processor circuit 1002, a system memory 1004, and a bus 1006 that couples various system components including system memory 1004 to processor circuit 1002. Processor circuit 1002 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 1002 may execute program code stored in a computer readable medium, such as program code of operating system 1030, application programs 1032, other programs 1034, etc. Bus 1006 represents one or more of any of several types of bus structures, including a memory bus or memory controller, a peripheral bus, an accelerated graphics port, and a processor or local bus using any of a variety of bus architectures. System memory 1004 includes read only memory (ROM) 1008 and random-access memory (RAM) 1010. A basic input/output system 1012 (BIOS) is stored in ROM 1008.

Computing device 1000 also has one or more of the following drives: a hard disk drive 1014 for reading from and writing to a hard disk, a magnetic disk drive 1016 for reading from or writing to a removable magnetic disk 1018, and an optical disk drive 1020 for reading from or writing to a removable optical disk 1022 such as a CD ROM, DVD ROM, or other optical media. Hard disk drive 1014, magnetic disk drive 1016, and optical disk drive 1020 are connected to bus 1006 by a hard disk drive interface 1024, a magnetic disk drive interface 1026, and an optical drive interface 1028, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 1030, one or more application programs 1032, other programs 1034, and program data 1036. Application programs 1032 or other programs 1034 may include, for example, computer program logic (e.g., computer program code or instructions) for implementing computing device 102, authentication UI 104, device management service 108, identity server 110, realm discovery system 112, multi-realm resource server 114, resources 116, authentication request receiver 302, authenticator 304, home realm discoverer 306, device management service interface 308, network address determiner 310, previous access determiner 312, authentication UI provider 314, access granter 316, realm mapping table 318, flowchart 200, flowchart 400, flowchart 500, flowchart 600, flowchart 700, and/or flowchart 800 (including any suitable step of flowcharts 200, 400, 500, 600, 700, or 800) and/or further example embodiments described herein.

A user may enter commands and information into the computing device 1000 through input devices such as keyboard 1038 and pointing device 1040. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 1002 through a serial port interface 1042 that is coupled to bus 1006, but may be connected by other interfaces, such as a parallel port, game port, or a universal serial bus (USB).

A display screen 1044 is also connected to bus 1006 via an interface, such as a video adapter 1046. Display screen 1044 may be external to, or incorporated in computing device 1000. Display screen 1044 may display information, as well as being a user interface for receiving user commands and/or other information (e.g., by touch, finger gestures, virtual keyboard, etc.). In addition to display screen 1044, computing device 1000 may include other peripheral output devices (not shown) such as speakers and printers.

Computing device 1000 is connected to a network 1048 (e.g., the Internet) through an adaptor or network interface 1050, a modem 1052, or other means for establishing communications over the network. Modem 1052, which may be internal or external, may be connected to bus 1006 via serial port interface 1042, as shown in FIG. 10, or may be connected to bus 1006 using another interface type, including a parallel interface.

As used herein, the terms "computer program medium," "computer-readable medium," and "computer-readable storage medium" are used to refer to physical hardware media such as the hard disk associated with hard disk drive 1014, removable magnetic disk 1018, removable optical disk 1022, other physical hardware media such as RAMs, ROMs, flash memory cards, digital video disks, zip disks, MEMs, nanotechnology-based storage devices, and further types of physical/tangible hardware storage media. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Example embodiments are also directed to such communication media that are separate and non-overlapping with embodiments directed to computer-readable storage media.

As noted above, computer programs and modules (including application programs 1032 and other programs 1034) may be stored on the hard disk, magnetic disk, optical disk, ROM, RAM, or other hardware storage medium. Such computer programs may also be received via network interface 1050, serial port interface 1042, or any other interface type. Such computer programs, when executed or loaded by an application, enable computing device 1000 to implement features of example embodiments described herein. Accordingly, such computer programs represent controllers of the computing device 1000.

Example embodiments are also directed to computer program products comprising computer code or instructions stored on any computer-readable medium. Such computer program products include hard disk drives, optical disk drives, memory device packages, portable memory sticks, memory cards, and other types of physical storage hardware.

IV. Example Embodiments

A system is disclosed herein. The system includes: one or more processors; and one or more memory devices that store program code configured to be executed by the one or more processors, the program code comprising: an authentication request receiver configured to: receive a request to access a resource from a client device; receive a device identifier from the client device; and an authenticator enacted in response to receiving the request to access the resource, the authenticator including: a home realm discoverer configured to determine, based at least on the device identifier, a home realm from among a plurality of realms; an authentication user interface (UI) provider configured to provide an authentication UI via which a flat-name username can be submitted; and an access granter that grants access to the resource based at least on a flat-name username submitted via the authentication UI and the home realm determined by the home realm discoverer.

In one implementation of the foregoing system, the home realm discoverer is configured to determine the home realm by: providing the device identifier to a device management service; receiving, from the device management service, a tenant identifier corresponding to the device identifier; and determining the home realm based on the tenant identifier.

In another implementation of the foregoing system, the device identifier comprises a network address; and the home realm discoverer is configured to determine the home realm by determining that the network address falls within a range of network addresses corresponding to the home realm.

In another implementation of the foregoing system, the home realm discoverer is configured to determine the home realm by determining that another user of the client device previously accessed resources associated with the home realm.

In another implementation of the foregoing system, the home realm discoverer is configured to identify a subsidiary realm of the home realm based at least on the device identifier.

In another implementation of the foregoing system, the authentication UI provider is configured to: determine that a flat-name structure of the home realm comprises a numerical format; and provide the authentication UI that automatically includes a numerical input interface.

In another implementation of the foregoing system, the authentication UI includes a pre-populated field that identifies the home realm.

A method is disclosed herein. The method includes: receiving a request to access a resource from a client device; receiving receive a device identifier from the client device; in response to receiving the request to access the resource: determining, based at least on the device identifier, a home realm from among a plurality of realms; providing an authentication user interface (UI) via which a flat-name username can be submitted; and granting access to the resource based at least on a flat-name username submitted via the authentication UI and the determined home realm.

In one implementation of the foregoing method, the determining the home realm from among the plurality of realms comprises: providing the device identifier to a device management service; receiving, from the device management service, a tenant identifier corresponding to the device identifier; and determining the home realm based on the tenant identifier.

In another implementation of the foregoing method, the device identifier comprises a network address; and the determining the home realm from among the plurality of realms comprises determining that the network address falls within a range of network addresses corresponding to the home realm.

In another implementation of the foregoing method, the determining the home realm from among the plurality of realms comprises: determining that another user of the client device previously accessed resources associated with the home realm.

In another implementation of the foregoing method, the method further includes: identifying a subsidiary realm of the home realm based at least on the device identifier.

In another implementation of the foregoing method, the providing the authentication UI comprises: determining that a flat-name structure of the home realm comprises a numerical format; and providing the authentication UI that automatically includes a numerical input interface.

In another implementation of the foregoing method, the authentication UI includes a pre-populated field that identifies the home realm.

A method is disclosed herein. The method includes: receiving a request to access a resource from a client device; receiving a device identifier from the client device; in response to receiving the request to access the resource: determining, based at least on the device identifier, two or more home realms from among a plurality of realms; and providing an authentication user interface (UI) via which a flat-name username can be submitted; and granting access to the resource based at least on a flat-name username submitted via the authentication UI and a user selection of a particular one of the two or more determined home realms.

In one implementation of the foregoing method, the determining the two or more home realms from among the plurality of realms comprises: providing the device identifier to a device management service; receiving, from the device management service, a tenant identifier corresponding to the device identifier; and determining at least one of the two or more home realms based on the tenant identifier.

In another implementation of the foregoing method, the device identifier comprises a network address; and the determining the two or more home realms from among the plurality of realms comprises determining that the network address falls within a range of network addresses corresponding to at least one of the two or more the home realm.

In another implementation of the foregoing method, the determining the two or more home realms from among the plurality of realms comprises: determining that another user of the client device previously accessed resources associated with at least one of the two or more home realms.

In another implementation of the foregoing method, the method further includes: identifying a subsidiary realm of at least one of the two or more home realms based at least on the device identifier.

In another implementation of the foregoing method, the authentication UI includes a pre-populated field that identifies at least one of the two or more home realms.

V. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A system, comprising:
one or more processors; and
one or more memory devices that store program code configured to be executed by the one or more processors, the program code comprising:
an authentication request receiver configured to:
receive a request to access a resource from a client device; and
receive a device identifier that identifies the client device, the received device identifier comprising an identifier that is unique to one or more organizations and excludes an express identification of a home realm; and
an authenticator enacted in response to receiving the request to access the resource, the authenticator including:
a home realm discoverer configured to:
access a device mapping that associates each of a plurality of device identifiers with a respective realm from among a plurality of realms, the plurality of device identifiers including the received device identifier, and determine the home realm from among the plurality of realms based at least on the received device identifier and the device mapping;

an authentication user interface (UI) provider configured to provide an authentication UI via which a flat-name username can be submitted; and an access granter that grants access to the resource based at least on a flat-name username submitted via the authentication UI and the home realm determined by the home realm discoverer.

2. The system of claim 1, wherein the home realm discoverer is configured to determine the home realm by:
providing the received device identifier to a device management service;
receiving, from the device management service, a tenant identifier corresponding to the received device identifier; and
determining the home realm based on the tenant identifier.

3. The system of claim 1, wherein the received device identifier comprises a network address; and
wherein the home realm discoverer is configured to determine the home realm by determining that the network address falls within a range of network addresses corresponding to the home realm.

4. The system of claim 1, wherein the home realm discoverer is configured to determine the home realm by determining that another user of the client device previously accessed resources associated with the home realm.

5. The system of claim 1, wherein the home realm discoverer is configured to identify a subsidiary realm of the home realm based at least on the received device identifier.

6. The system of claim 1, wherein the authentication UI provider is configured to:
determine that a flat-name structure of the home realm comprises a numerical format; and
provide the authentication UI that automatically includes a numerical input interface.

7. The system of claim 1, wherein the authentication UI includes a pre-populated field that identifies the home realm.

8. A method, comprising:
receiving a request to access a resource from a client device;
receiving a device identifier that identifies the client device, the received device identifier comprising an identifier that is unique to one or more organizations and excludes an express identification of a home realm;
in response to receiving the request to access the resource:
accessing a device mapping that associates each of a plurality of device identifiers with a respective realm from among a plurality of realms, the plurality of device identifiers including the received device identifier;
determining the home realm from among the plurality of realms based at least on the received device identifier and the device mapping;
providing an authentication user interface (UI) via which a flat-name username can be submitted; and
granting access to the resource based at least on a flat-name username submitted via the authentication UI and the determined home realm.

9. The method of claim 8, wherein the determining the home realm from among the plurality of realms comprises:
providing the received device identifier to a device management service;
receiving, from the device management service, a tenant identifier corresponding to the received device identifier; and
determining the home realm based on the tenant identifier.

10. The method of claim 8, wherein the received device identifier comprises a network address; and
wherein the determining the home realm from among the plurality of realms comprises determining that the network address falls within a range of network addresses corresponding to the home realm.

11. The method of claim 8, wherein the determining the home realm from among the plurality of realms comprises:
determining that another user of the client device previously accessed resources associated with the home realm.

12. The method of claim 8, further comprising:
identifying a subsidiary realm of the home realm based at least on the received device identifier.

13. The method of claim 8, wherein the providing the authentication UI comprises:
determining that a flat-name structure of the home realm comprises a numerical format; and
providing the authentication UI that automatically includes a numerical input interface.

14. The method of claim 8, wherein the authentication UI includes a pre-populated field that identifies the home realm.

15. A method, comprising:
receiving a request to access a resource from a client device;
receiving a device identifier that identifies the client device, the received device identifier comprising an identifier that is unique to one or more organizations and excludes an express identification of a home realm;
in response to receiving the request to access the resource:
accessing a device mapping that associates each of a plurality of device identifiers with at least one respective realm from among a plurality of realms, the plurality of device identifiers including the received device identifier;
determining two or more home realms from among the plurality of realms based at least on the received device identifier and the device mapping;
providing an authentication user interface (UI) via which a flat-name username can be submitted; and
granting access to the resource based at least on a flat-name username submitted via the authentication UI and a user selection of a particular one of the two or more determined home realms.

16. The method of claim 15, wherein the determining the two or more home realms from among the plurality of realms comprises:
providing the received device identifier to a device management service;
receiving, from the device management service, a tenant identifier corresponding to the received device identifier; and
determining at least one of the two or more home realms based on the tenant identifier.

17. The method of claim 15, wherein the received device identifier comprises a network address; and
wherein the determining the two or more home realms from among the plurality of realms comprises determining that the network address falls within a range of network addresses corresponding to at least one of the two or more home realms.

18. The method of claim 15, wherein the determining the two or more home realms from among the plurality of realms comprises:

determining that another user of the client device previously accessed resources associated with at least one of the two or more home realms.

19. The method of claim 15, further comprising:
identifying a subsidiary realm of at least one of the two or more home realms based at least on the received device identifier.

20. The method of claim 15, wherein the authentication UI includes a pre-populated field that identifies at least one of the two or more home realms.

21. The system of claim 1, wherein the received device identifier comprises at least one of a hardware or software-based identifier that identifies the client device.

22. The method of claim 8, wherein the received device identifier comprises at least one of a hardware or software-based identifier that identifies the client device.

23. The method of claim 15, wherein the received device identifier comprises at least one of a hardware or software-based identifier that identifies the client device.

\* \* \* \* \*